United States Patent [19]
Reck et al.

[11] Patent Number: 6,051,640
[45] Date of Patent: Apr. 18, 2000

[54] USE OF CATIONICALLY STABILIZED AQUEOUS POLYMER EMULSIONS AS BINDERS FOR MOLDINGS BASED ON FINELY DIVIDED MATERIALS HAVING A NEGATIVE SURFACE CHARGE

[75] Inventors: Bernd Reck, Grünstadt; Wilhelm Friedrich Beckerle, Bobenheim-Roxheim; Michael Portugall, Wachenheim; Eckehardt Wistuba, Bad Dürkheim; Martin Meister, Neustadt, all of Germany

[73] Assignee: BASF Aktiengesellschaft, Ludwigshafen, Germany

[21] Appl. No.: 08/622,290

[22] Filed: Mar. 25, 1996

[30] Foreign Application Priority Data

Mar. 27, 1995 [DE] Germany .................... 195 11 130

[51] Int. Cl.$^7$ ..................................... C08K 5/17
[52] U.S. Cl. ............................................. 524/237
[58] Field of Search ................................ 524/237

[56] References Cited

FOREIGN PATENT DOCUMENTS

| 0 266 850 | 5/1988 | European Pat. Off. . |
| 0 475 166 | 3/1992 | European Pat. Off. . |
| 0 486 374 | 5/1992 | European Pat. Off. . |
| 0 497 100 | 8/1992 | European Pat. Off. . |

*Primary Examiner*—Peter D. Mulcahy
*Attorney, Agent, or Firm*—Oblon, Spivak, McClelland, Maier & Neustadt, P.C.

[57] ABSTRACT

Cationically stabilized aqueous styrene/(meth)acrylate copolymer emulsions whose dispersed copolymer has a static glass transition temperature of from 40 to 110° C. and which contain, as a dispersant, a mixture of at least one organic monoamine of ≧8 carbon atoms and an acid addition salt thereof are used as binders for moldings based on finely divided materials having a negative surface charge.

6 Claims, No Drawings

USE OF CATIONICALLY STABILIZED AQUEOUS POLYMER EMULSIONS AS BINDERS FOR MOLDINGS BASED ON FINELY DIVIDED MATERIALS HAVING A NEGATIVE SURFACE CHARGE

The present invention relates to the use of cationically stabilized aqueous polymer emulsions, containing
a dispersed copolymer A which, in polymerized form, is composed of

| | |
|---|---|
| from 30 to 80 | parts by weight of styrene (monomer a), |
| from 20 to 70 | parts by weight of at least one monomer selected from the group consisting of esters of acrylic and methacrylic acid with $C_1$-$C_8$-alkanols (monomers b) and |
| from 0 to 10 | parts by weight of other monomers capable of free radical copolymerization (monomers c), | with the proviso that the static glass transition temperature Tg (DSC, midpoint temperature according to ASTM D 3418-82, cf. Ullmann's Encyclopedia of Industrial Chemistry, VCH Weinheim (1992), page 169) of the copolymer A is from 40 to 110° C., and as dispersant B, a mixture consisting of at least one primary, secondary and/or tertiary organic monoamine of at least eight carbon atoms and an acid addition salt thereof,
as binders for moldings based on finely divided materials having a negative surface charge.

The present invention furthermore relates to the novel use of suitable aqueous polymer emulsions and the preparation thereof. The present invention also relates to processes for the production of moldings based on finely divided materials having a negative surface charge with application of the use according to the invention, and the resulting moldings.

The use of aqueous polymer emulsions as binders for moldings based on finely divided materials having a negative surface charge is disclosed, for example, in EP-A 266 850. Attempts are made to obtain in particular moldings which have high dimensional stability both at elevated temperatures and under humid conditions. Of particular interest are sheet-like moldings (boards) which have high dimensional stability in a humid warm atmosphere (tropical climate) and are suitable, for example, as lightweight building boards, in particular ceiling boards. Of course, the internal strength of such moldings should also be satisfactory. EP-A 266 850 mentions, for example, mineral wool and cellulose fibers as finely divided materials having a negative surface charge. As binders, it recommends aqueous polymer emulsions of dispersed polymers whose static glass transition temperature is at least 35° C. The monomer composition can be varied over wide ranges and extends from polymers composed essentially exclusively of esters of acrylic or methacrylic acid to those polymers which also contain styrene as polymerized units in addition to the abovementioned monomers. However, the disadvantage of the binders recommended in EP-A 266 850 is that they are exclusively anionically and/or nonionically stabilized, ie. the emulsifiers used are exclusively anionic and/or nonionic.

This is a disadvantage in that anionically and/or nonionically stabilized polymer particles have no particular affinity to the surface of finely divided starting materials to be bound. It is therefore necessary to add polymeric cationic flocculent in order to deposit the dispersed polymer onto the surface of the finely divided starting materials. However, even when such flocculent is present, the polymer is not deposited particularly uniformly onto the surface of the finely divided starting materials, reducing the quality of the resulting moldings.

U.S. Pat. No. 4,187,142 also relates to moldings based on finely divided materials having a negative surface charge and aqueous polymer emulsions as binders. A typical feature of the aqueous polymer emulsion recommended as a binder in U.S. Pat. No. 4,187,142 is that the dispersing of the polymer particles is effected by means of cationic charges which are essentially independent of the pH of the aqueous dispersing medium. However, the disadvantage of the binders recommended in U.S. Pat. No. 4,187,142 is that a polymeric anionic flocculent must be added in order to deposit the dispersed polymer contained in said binders onto the surface of the finely divided starting materials. Another disadvantage is that such a polymer deposited onto the surface of the finely divided starting materials still has the essentially permanent cationic charges ensuring compatibility with water, but this results in high water absorption of the moldings in a humid climate and hence reduced dimensional stability.

EP-A 475 166 relates to moldings based on finely divided materials having a negative surface charge and aqueous polymer emulsions whose dispersed polymer is composed essentially exclusively of esters of acrylic acid and is kept in dispersion by means of a mixture consisting of at least one primary, secondary and/or tertiary organic monoamine and an acid addition salt thereof.

The deposition of the dispersed polymers is effected by increasing the pH of the aqueous dispersing medium. This causes deactivation of the amine emulsifiers, resulting in reduced water absorption in a humid climate and hence high dimensional stability. EP-A 475 166 relates in particular to the production of lightweight building boards. However, the disadvantage of the moldings of EP-A 475 166 is that their dimensional stability in a humid warm climate is not completely satisfactory. Their rigidity is also unsatisfactory.

It is an object of the present invention to provide suitable aqueous polymer emulsions for use as binders for moldings based on finely divided materials having a negative surface charge, which polymer emulsions do not have the disadvantages of the aqueous polymer emulsions recommended in the prior art as binders for such moldings. We have found that this object is achieved by the use of aqueous polymer emulsions which is defined at the outset.

The static glass transition temperature of the copolymer A is preferably from 60 to 110° C., particularly preferably from 80 to 100° C. According to Fox [T. G. Fox, Bull. Am. Phys. Soc. (Ser. II) 1 (1956), 123], a good approximation for the relationship between static glass transition temperature and monomer composition of copolymers is $$\frac{1}{Tg} = \frac{X^1}{Tg^1} + \frac{X^2}{Tg^2} + \ldots \frac{X^n}{Tg^n},$$

where $X^1, X^2, \ldots, X^n$ are the mass fractions of the monomers $1, 2, \ldots, n$ and $Tg^1, Tg^2, \ldots Tg^n$ are the static glass transition temperatures of the corresponding homopolymers in degrees Kelvin. The static glass transition temperatures of the homopolymers of the monomers a), b) and c) are known and are stated, for example, in J. Brandrup, E. H. Immergut, Polymer Handbook, 1st Ed., J. Wiley, New York 1966 and $2^{nd}$ Ed., J. Wiley, New York, 1975. As a rule, the resulting molding contains from 1 to 25, preferably from 3 to 15, particularly preferably from 5 to 10, % by weight, based on its total weight, of novel copolymer A.

Particularly suitable comonomers from the group consisting of esters of acrylic and methacrylic acid with $C_1$–$C_8$-alkanols are methyl acrylate, ethyl acrylate, n-butyl acrylate, 2-ethylhexyl acrylate, methyl methacrylate and tert-butyl methacrylate. The number average molecular weight of the dispersed copolymer A is usually from $5 \cdot 10^4$ to $3 \cdot 10^6$, preferably from $1 \cdot 10^5$ to $1 \cdot 10^6$. The solids content of the aqueous polymer emulsions to be used according to the invention is usually from 20 to 60, preferably from 35 to 55, % by weight. The number average diameter of the dispersed polymer particles is usually from 50 to 1000 nm, preferably from 100 to 500 nm. As a rule, the aqueous polymer emulsion to be used according to the invention contains exclusively copolymer A as the dispersed polymer. The pH of the aqueous dispersing medium of the aqueous polymer emulsions to be used according to the invention is usually $\leq 7$, preferably from 7 to 1, particularly preferably from 2 to 5, very particularly preferably from 2 to 4. Advantageously, the amount of monomer a) is at least 40, frequently at least 50, but not more than 80, % by weight, based on the weight of the copolymer A.

Suitable monomers c) capable of free radical copolymerization are olefins, such as ethylene, vinylaromatic monomers other than styrene, such as α-methylstyrene, o-chlorostyrene or vinyltoluenes, esters of vinyl alcohol and monocarboxylic acids of 1 to 18 carbon atoms, such as vinyl acetate, vinyl propionate, vinyl n-butyrate, vinyl laurate, vinyl pivalate and vinyl stearate, and commercially available monomers VEOVA® 9-11 (VEOVA X is a tradename of Shell and relates to vinyl esters of carboxylic acids which are also referred to as Versatic® X acids), dimethyl maleate or n-butyl maleate, nitriles of α,β-monoethylenically unsaturated carboxylic acids, such as acrylonitrile or methacrylonitrile, α,β-monoethylenically unsaturated mono- and dicarboxylic acids, such as acrylic acid, methacrylic acid, maleic acid, fumaric acid and itaconic acid, and vinylsulfonic acid and the water-soluble salts thereof and N-vinylpyrrolidone and others. Preferably, the monomers c) used are not ionic monomers.

In addition to the mixtures which are required as dispersants B essential to the invention and which consist of at least one primary, secondary and/or tertiary organic monoamine of at least eight carbon atoms and an acid addition salt thereof, the aqueous polymer emulsions to be used according to the invention may additionally contain other nonionic and/or cationic dispersants. However, the dispersants B advantageously account for at least 25, preferably at least 50, particularly preferably at least 75, very particularly preferably 100, % by weight of the total amount of dispersants present.

Advantageous novel dispersants B contain, as the amine component, at least one compound of the general formula I

(I)

where

R is $C_8$–$C_{18}$-alkyl or $C_8$–$C_{18}$-alkenyl,

U and V are each $C_2$–$C_4$-alkylene,

X and Y are each hydrogen, $C_1$–$C_{18}$-alkyl or $C_2$–$C_{18}$-alkenyl and n and m are each an integer from 0 to 15.

These compounds are long-chain amines which have 8 to 18 carbon atoms in the hydrocarbon radical and may carry one or two further radicals on the nitrogen atom. Suitable radicals in addition to $C_1$–$C_{18}$-alkyl and $C_2$–$C_{18}$-alkenyl are polyalkylene oxide radicals which consist of up to 10 $C_2$–$C_4$-alkylene oxide units and may carry terminal hydrogen, $C_1$–$C_{18}$-alkyl or $C_2$–$C_{18}$-alkenyl groups. Examples of these are laurylamine, dimethyloleylamine and the reaction product of 1 mol of stearylamine with 10 mol of ethylene oxide or of 1 mol of oleylamine with 12 mol of ethylene oxide. Compounds of the general formula I where n and/or m are $\neq 0$, in particular $\geq 2$, are preferred.

Starting from the primary, secondary and/or tertiary amines essential to the invention, organic or inorganic acids, such as formic acid, acetic acid, propionic acid, glycolic acid, nitric acid, phosphoric acid, sulfuric acid, hydrochloric acid or hydrobromic acid, are suitable for the formation of their acid addition salts (for ammonium salt formation).

The dispersants B to be concomitantly used according to the invention are present as a rule in an amount of from 0.2 to 15, preferably from 0.5 to 8, in particular from 0.8 to 4, % by weight, based on the copolymer A, in the aqueous polymer emulsions to be used according to the invention.

Examples of suitable nonionic codispersants are ethoxylated mono-, di- and trialkylphenols (degree of ethoxylation: from 3 to 100, alkyl radical: $C_4$ to $C_{12}$), ethoxylated fatty alcohols and oxo alcohols (degree of ethoxylation: from 3 to 100, alkyl radical: $C_8$ to $C_{18}$) and sulfosuccinates.

Ethylene oxide/propylene oxide block polymers, alkyl glycosides, fatty acid ethoxylates, fatty amide ethoxylates, water-soluble starches, hydroxyethylcellulose, polyvinyl alcohols having different degrees of hydrolysis and molecular weights and polyvinylpyrrolidone are also suitable.

Suitable cationic codispersants are tetraalkylammonium salts, N,N-dialkylimidazolines, N-alkylpyridinium salts, etc., as described, for example, in Ullmann's Encyklopädie der technischen Chemie, Vol. 22, Verlag Chemie, Weinheim (1982), page 496 etc. or in U.S. Pat. No. 5,045,576.

Suitable finely divided materials having a negative surface charge are both natural and synthetic materials. They may have either a fibrous or a granular structure. Examples of finely divided mineral materials, such as mineral fibers (for example rockwool, basalt wool, slag wool and glass fibers having fiber lengths of in general from 0.2 to 5 cm, in particular from 0.5 to 2.5 cm, and thicknesses of from about 1.7 to 3.3 dtex; tex is the unit for the length-related mass of fibers; 1 tex=1 g/km=1 mg/m=10 dtex), and organic fibers, such as wood fibers (these include primarily ground and digested wood, such as pine wood; usually, such wood fibers are produced from wood shavings, wood chips or sawdust (for example Ullmann's Encyklopädie der technischen Chemie, 4th Edition, Vol. 12, page 720 etc.)), cellulose fibers, coconut fibers and banana fibers, fibers from paper, flax, sisal, jute, straw, cork, etc. These fibers usually have a length of from 0.3 to 1.5 cm and a thickness of from 10 to 30 dtex. Examples of suitable nonfibrous finely divided starting materials are fire-dried sands, finely divided clays, expanded clays, montmorillonite, kaolin, perlite, feldspar, chalk, kieselguhr and mica. Each of the abovementioned finely divided materials having a negative surface charge can be used by themselves for the production of novel moldings. However, mixtures of these finely divided materials can of course also be used. Particularly frequently, mixutures of fibers and granular materials are used. The amount of granular material is as a rule from 20 to 80, preferably from 30 to 60, % by weight, based on the fibers used.

The novel moldings may also contain conventional fireproofing agents, for example aluminum silicates and aluminum hydroxides, borates, such as sodium tetraborate and/or phosphates, such as primary sodium phosphate. Finally, it may be advantageous in some cases also to add up to 5% by weight, based on the amount of finely divided starting material having a negative surface charge, of water repellents, such as silicones (polysiloxanes) and waxes.

The novel moldings can be produced by various methods. Preferably, an aqueous suspension is produced from the finely divided starting materials having a negative surface charge, and the aqueous polymer emulsion to be used according to the invention is added to said suspension. The pH of the aqueous medium is subsequently increased by adding simple basic materials, such as borates (eg. sodium tetraborate=borax), carbonates, bicarbonates, alkali metal hydroxides or alkaline earth metal hydroxides (eg. calcium hydroxide), with the result that the polymeric binder is precipitated onto the finely divided starting materials (the novel amine dispersant is deactivated). Alternatively, precipitation may also be effected by adding salts having polyvalent anions, such as aluminum sulfate. Surprisingly, such moldings too have high water resistance. The resulting mixture is introduced into a mold and dewatered, which can be effected, for example, by suction and/or pressing and/or sieving. The still wet molding is usually dried in the course of from 0.1 to 10 hours at, usually, from 100 to 250° C. The drying means used may be drying ovens, through-circulation dryers, infrared lamps, microwave emitters and/or heatable presses. During dewatering, particularly clear water is obtained when small amounts of conventional flocculents are added before the dewatering.

According to the invention, sheet-like moldings, in particular rectangular ones, are preferred. The ratio of length or width to thickness of such sheet-like, rectangular moldings is advantageously from 10:1 to 100:1. The length and width are preferably from 30 to 70 cm. The thickness is, as a rule, from 1 to 200 mm, particularly preferably from 10 to 20 mm. Such sheet-like moldings are used, for example, as ceiling boards, sound insulation boards or heat insulation boards. They can of course be provided with the appropriate sound-absorbing structures.

Sheet-like moldings having an irregular contour can also be produced in a corresponding manner using suitable compression molds. Their thickness is, as a rule, from 0.5 to 10 mm, particularly preferably from 1 to 5 mm. The surface area is typically from 200 to 20,000 cm$^2$.

The aqueous polymer emulsions to be used according to the invention are obtainable in a manner known per se, by free radical aqueous emulsion polymerization. Feed processes in which the initiator and/or the monomers, which may be emulsified in water, are added a little at a time or continuously during the polymerization may be used (cf. for example Encyclopedia of Polymer Science and Engineering, Vol. 6 (1986), 1 to 52). As a rule, some of the polymerization batch is initially taken in the polymerization vessel and heated to the polymerization temperature and the remainder of the polymerization batch is added to the polymerization vessel while maintaining the polymerization temperature. In the feed process, monomers and initiators are preferably added via feeds located at different points. Of course, molecular weight regulators, such as mercaptans and thioglycolates, may be present. Suitable free radical polymerization initiators are both azo compounds and neutral peroxides, such as $H_2O_2$ or tert-butyl hydroperoxide. Anionic free radical initiators, such as sodium peroxodisulfate, should not be used since they may cause coagulum formation in the novel cationically stabilized aqueous polymer emulsions. A particularly advantageously used free radical initiator is 2,2'-azobis(2-amidinopropane hydrochloride). This compound is commercially available, for example as V 50 from Wako Chemicals GmbH.

It is a compound having the structure

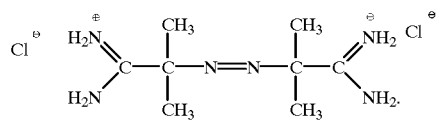

When this free radical initiator is used, copolymers A which contain groups of the structure

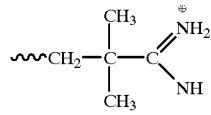

are obtained, which proves to be advantageous according to the invention. Very generally, the free radical aqueous emulsion polymerization for the preparation of the novel aqueous polymer emulsion is carried out at a pH of the aqueous dispersing medium of $\leq 7$. Usually, polymerization is carried out under an inert gas atmosphere. Free radical peroxide polymerization initiators can be activated in a manner known per se by adding organic reducing agents, eg. ascorbic acid and/or polyvalent transition metal ions, such as $Fe^{2+}$. The amount of free radical initiator is as a rule from 0.1 to 3% by weight, based on the amount of monomers to be polymerized. By physical and/or chemical deodorization carried out in a manner known per se, residual monomers can be removed from the novel aqueous polymer emulsions.

EXAMPLES

A) Preparation of aqueous polymer emulsions Di to be used according to the invention and a comparative emulsion VD D1: 806 g of water were initially taken in a polymerization vessel having a capacity of 3.5 l and were heated to 80° C. The polymerization vessel was then flushed with nitrogen. Thereafter, 10% by weight of the total amount of a feed 1 and 10% by weight of the total amount of a feed 2 were added all at once to the polymerization vessel and the mixture was polymerized for 15 minutes at 80° C. The remaining amount of feed 1 was then added to the polymerization vessel in the course of 3 hours while maintaining the temperature of 80° C. and, beginning at the same time, the remaining amount of feed 2 was added continuously in the course of 3.5 hours at a separate point in space. After the end of feed 2, polymerization was continued for a further hour while maintaining the temperature of 80° C. An aqueous polymer emulsion which had a solids content of 40.1% by weight and whose aqueous dispersing medium had a pH of 3.4 was obtained.

| Feed 1: | 833 g | of water, |
|---|---|---|
| | 863 g | of styrene, |
| | 288 g | of methyl acrylate and |
| | 15 g | of a mixture of the formates of straight-chain $C_{12}$–$C_{15}$-alkyl monoamines; |
| Feed 2: | 11.5 g | of 2,2'-azobis(2-amidinopropane hydrochloride) = azo V 50 and |
| | 100 g | of water |

VD: As for D1, except that the 863 g of styrene in feed 1 were replaced by 863 g of methyl methacrylate (styrene and methyl methacrylate have essentially identical molecular weights and, according to Ullmann's Encyclopedia of Industrial Chemistry, VCH Weinheim (1992), page 169, contribute in essentially the same way to the glass transition temperature of the copolymer A). An aqueous polymer emulsion which had a solids content of 40.3% by weight and whose aqueous dispersing medium had a pH of 3.5 was obtained.

D2: As for D1, except that the initially taken mixture comprised only 263 g of water and the feeds had the following compositions:

| Feed 1: | 766 g | of water, |
| --- | --- | --- |
| | 7 g | of a 20% strength by weight sulfuric acid, |
| | 65 g | of a 40% strength by weight aqueous solution of ethoxylated oleyl monoamine (degree of ethoxylation: 12), |
| | 650 g | of styrene, |
| | 390 g | of methyl methacrylate and |
| | 260 g | of n-butyl acrylate; |
| Feed 2: | 100 g | of water and |
| | 3 g | of azo V 50. |

An aqueous polymer emulsion which had a solids content of 45.4% by weight and whose aqueous dispersing medium had a pH of 2.7 was obtained.

D3: As for D1, except that the initially taken mixture comprised 652 g of water and the feeds had the following composition:

| Feed 1: | 766 g | of water |
| --- | --- | --- |
| | 34 g | of a 20% strength by weight aqueous solution of the acetate of ethoxylated oleyl monoamine (degree of ethoxylation: 12), |
| | 420 g | of styrene and |
| | 180 g | of methyl methacrylate; |
| Feed 2: | 67 g | of water and |
| | 2 g | of azo V 50. |

An aqueous polymer emulsion which had a solids content of 49.9% by weight and whose aqueous dispersing medium had a pH of 3.6 were obtained.

D4: As for D1, except that the initially taken mixture contained

| 1579 g | of water, |
| --- | --- |
| 14 mg | of $FeSO_4 \cdot 7H_2O$ and |
| 86 g | of a 20% strength by weight aqueous solution of the acetate of ethoxylated oleyl monoamine (degree of ethoxylation: 12). |

Furthermore, the feeds consisted of:

| Feed 1: | 932 g | of styrene and |
| --- | --- | --- |
| | 230 g | of n-butyl acrylate; |
| Feed 2: | 60 g | of water and |
| | 38 g | of a 30% strength by weight hydrogen peroxide solution. |

Furthemore, the polymerization temperature was 90° C.

An aqueous polymer emulsion which had a solids content of 40.2% by weight and whose aqueous dispersing medium had a pH of 2.9 was obtained.

D5: As for D1, except that the initially taken mixture contained 670 g of water and the feeds had the following compositions:

| Feed 1: | 788 g | of water, |
| --- | --- | --- |
| | 4 g | of 75% strength by weight phosphoric acid, |
| | 49 g | of a 40% strength by weight aqueous solution of ethoxylated oleylmonoamine (degree of ethoxylation: 12), |
| | 910 g | of styrene, |
| | 230 g | of methyl methacrylate and |
| | 130 g | of n-butyl acrylate; |
| Feed 2: | 100 g | of water and |
| | 3 g | of azo V50. |

An aqueous polymer emulsion which had a solids content of 45.3% by weight and whose aqueous dispersing medium had a pH of 3.0 was obtained.

D6: As for D1, except that the initially taken mixture comprised 241 g of water and the feeds had the following compositions:

| Feed 1: | 107 g | of water, |
| --- | --- | --- |
| | 165 g | of a 10% strength by weight aqueous solution of the acetate of oleylmonoamine, |
| | 220 g | of styrene, |
| | 220 g | of methyl methacrylate and |
| | 110 g | of n-butyl acrylate; |
| Feed 2: | 33 g | of 10% strength by weight aqueous solution of tert-butyl hydroperoxide; |
| Feed 3: | 42 g | of 5% strength by weight solution of ascorbic acid. |

Feed 3 was added to the polymerization vessel synchronously with feed 2.

Further, the polymerization temperature was 60° C.

An aqueous polymer emulsion which had a solids content of 50.7% by weight and whose aqueous dispersing medium had a pH of 4.2 was obtained.

B) Use of the aqueous polymer emulsions from A) as binders for mineral fiber boards The respective aqueous polymer emulsion from A), in each case diluted to a solids content of 40% by weight, was stirred (in an amount of 7% by weight, based on the weight of the fibers to be bound, of dispersed polymer) into a mixture of 7200 g of water, 250 g of mineral wool and 89 g of kaolin.

The dispersed polymer was then precipitated onto the mineral fibers by adding 50 ml of a 2% strength by weight aqueous borax solution (sodium tetraborate). The fiber slurry obtained was then pressed in a screen (25 cm×25 cm) with the aid of a ram with a pressure of 3 bar, a raw board having a thickness of about 2 cm and a residual moisture content of about 50% by weight being obtained. The raw board was dried for 6 hours in a through-circulation oven at 160° C.

Raw boards measuring 60 cm×60 cm×2 cm were also produced in a corresponding manner.

The mineral fiber boards thus obtained were tested as follows:

1. Density determination:

Test specimens having a length of 25 cm, a width of 5 cm and a thickness of 1.5 cm were ground from the resulting mineral fiber boards measuring 25 cm×25 cm×2 cm. Their density in g/cm³ was calculated from the weight of these test specimens (mean value of two determinations). The densities obtained are shown in Table 1.

2. Water absorption:

The test specimens from the density determination were stored under water at room temperature for 2 hours. The increase in weight was determined by weighing after carefully dabbing dry the outer surface. The results obtained (mean value of two determinations, stated in % by weight, based on the initial weight) are shown in Table 1.

3. Dimensional stability:

Test specimens measuring 60 cm×60 cm and having a thickness of 1.5 cm were ground from the boards measuring 60 cm×60 cm×2 cm by means of a grinder. These test specimens were placed flat and horizontally and supported at two opposite edges at 38° C. and a relative humidity of 95%. After 200 hours, the sag of the boards (lowering of the geometric midpoint relative to its initial position) under their own weight was determined. The values found are shown in Table 1.

TABLE 1

| Binder | Tg [° C.] of the polymer | Density [g/cm³] | Water absorption [% by weight] | Sag [mm] |
|---|---|---|---|---|
| D1 | 82 | 0.29 | 10.7 | 0.24 |
| VD | 80 | 0.30 | 32.2 | 0.62 |
| D2 | 68 | 0.31 | 16.7 | 0.43 |
| D3 | 100 | 0.32 | 6.7 | 0.20 |
| D4 | 69 | 0.31 | 5.3 | 0.36 |
| D5 | 88 | 0.30 | 14.3 | 0.29 |
| D6 | 66 | 0.28 | 8.0 | 0.41 |

C. Use of the aqueous polymer emulsions from A) as binders for wood fiber boards Wood fibers having a dry weight of 120 g were disintegrated in 4000 ml of water while stirring. The particular aqueous polymer emulsion from A), in each case diluted to a solids content of 40% by weight, were stirred (in an amount of 7.2 g, calculated as dry weight) into the resulting fiber slurry. 37.8 g of a 5% strength by weight aqueous alaun solution (aluminum sulfate solution) were then added while stirring, after which dilution was effected by the addition of 2800 ml of water. For sheet formation, the fiber slurry was poured into a screen frame (25 cm×25 cm) and dewatered to a residual moisture content of about 70% by weight by pressing with a ram under a pressure of 4 bar. These raw boards were pressed under a pressure of 20 bar for 15 minutes at 180° C. (thickness=3 mm).

The wood fiber boards thus obtained were tested as follows:

1. Density determination:

Circular test specimens having a diameter of 9 cm were punched out of the wood fiber boards by means of a punch. The density in g/cm³ (mean value of two determinations) was calculated from the weight of these test specimens. The densities obtained are shown in Table 2.

2. Water absorption:

The test specimens from the density determination were stored under water for 24 hours at room temperature. The increase in weight was determined by weighing after carefully dabbing dry the outer surface. The results obtained (mean value of two determinations, stated in % by weight, based on the initial weight) are shown in Table 2.

3. Rigidity:

The modulus of elasticity (a measure of the work to be done to bend the boards) of the wood fiber boards was determined in the 3-point bending test according to ISO 178-1992, as a measure of the rigidity of said boards. The results obtained are shown in Table 2 in MPa (mean value of 8 individual measurements).

TABLE 2

| Binder | Density [g/cm³] | Water absorption [% by weight] | Modulus of elasticity (MPa) |
|---|---|---|---|
| D1 | 0.83 | 47.1 | 3010 |
| VD | 0.88 | 83.0 | 2500 |
| D2 | 0.84 | 48.4 | 2720 |
| D3 | 0.85 | 59.8 | 2230 |
| D4 | 0.85 | 49.1 | 2940 |
| D5 | 0.80 | 53.0 | 2970 |
| D6 | 0.83 | 54.8 | 2490 |

D) Electrokinetic investigation of the aqueous polymer emulsions D1 and VD from A) at 25° C.

As indicated by Tables 1 and 2, the binder VD is inferior to the novel binders, in particular binder D1. In order to be able to understand this difference, the electrophoretic mobility of the dispersed polymer particles was determined with the aid of microelectrophoresis (apparatus: PenKem 3000 from Penkem). For this purpose, 0.32 g of emulsion was diluted with 1 l of 10 mM aqueous KCl solution. The pH was brought to 3 before the beginning of the measurements by adding $H_3PO_4$. The following mobilities u were obtained as the result:

VD: $u$=2.8 (µm/s)/(V/cm);

D1: $u$=5.5 (µm/s)/(V/cm).

Surprisingly, the novel styrene/(meth)acrylate copolymer particles exhibit significantly higher electrophoretic mobilities, ie. significantly higher cationic characters. This is presumably the reason for a high affinity to the negative surface charge of the finely divided starting material and consequently for particularly uniform deposition on said material, which is probably the reason for the improvement of the quality of the moldings.

We claim:

1. A cationically stabilized aqueous polymer emulsion, containing a dispersed copolymer A which, in polymerized form, is composed of

| | |
|---|---|
| from 30 to 80 | parts by weight of styrene (monomer a), |
| from 20 to 70 | parts by weight of at least one monomer selected from the group consisting of esters of acrylic and methacrylic acid with $C_1$-$C_8$-alkanols (monomers b) and |
| from 0 to 10 | parts by weight of other monomers capable of free radical copolymerization (monomers c), | with the proviso that the static glass transition temperature Tg of the copolymer A is from 40 to 110° C., and as dispersant B, a mixture consisting of at least one primary, secondary or tertiary organic monoamine of at least eight carbon atoms and an acid addition salt thereof.

2. An aqueous polymer emulsion as claimed in claim 1, wherein the static glass transition temperature Tg of the copolymer A is from 60 to 110° C.

3. An aqueous polymer emulsion as claimed in claim 1, wherein the static glass transition temperature Tg of the copolymer A is from 80 to 100° C.

4. An aqueous polymer emulsion as claimed in claim 1, wherein the copolymer A contains from 40 to 80% by weight, based on its mass, of styrene in the form of polymerized units.

5. An aqueous polymer emulsion as claimed in claim 1, which contains, as a component of the dispersant B, at least one compound of the formula I

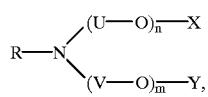
(I)

where
R is $C_8$–$C_{18}$-alkyl or $C_8$–$C_{18}$-alkenyl,
U and V are each $C_2$–$C_4$-alkylene,
X and Y are each hydrogen, $C_1$–$C_{18}$-alkyl or $C_2$–$C_{18}$-alkenyl and
n and m are each an integer from 0 to 15.

6. An aqueous polymer emulsion as claimed in claim 1, whose copolymer A contains groups having the structure

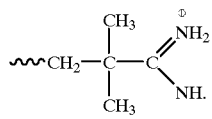

* * * * *